United States Patent [19]

Nakamura et al.

[11] Patent Number: 4,733,455
[45] Date of Patent: Mar. 29, 1988

[54] METHOD OF MANUFACTURING A MAGNETIC HEAD WITH AN MR ELEMENT

[75] Inventors: Hiroshi Nakamura; Masaki Murakami; Kouji Takeda; Yoshimasa Tanaka, all of Yokohama; Hirofumi Imaoka, Yokosuka; Mikio Naoi, Tokyo; Takayuki Nakashima, Yokohama, all of Japan

[73] Assignee: Victor Company of Japan, Limited, Kanagawa, Japan

[21] Appl. No.: 891,516

[22] Filed: Jul. 29, 1986

[30] Foreign Application Priority Data

Aug. 7, 1985 [JP] Japan .................................. 60-173804

[51] Int. Cl.⁴ .............................................. G11B 5/42
[52] U.S. Cl. ....................................... 29/603; 29/827; 264/272.16; 360/113
[58] Field of Search .................. 29/603, 827; 360/113, 360/122; 264/272.16

[56] References Cited

U.S. PATENT DOCUMENTS 4,424,542 1/1984 Ujihara et al. .................... 29/603 X Primary Examiner—Carl E. Hall
Attorney, Agent, or Firm—Jordan and Hamburg

[57] ABSTRACT

A magnetic head using an MR element and a permanent magnet for applying a bias magnetic field to the MR element, and a lead frame of the head. A sheet of metal is punched or otherwise shaped in a predetermined pattern to produce the lead frame. The lead frame includes sections mounting the MR element and permanent magnet, lead connecting sections electrically connected to connecting sections of the MR element, and tape-contact sections which are flush with a tape-contact surface of the MR element. The lead frame mounted with the MR element and permanent magnet and provided with the lead connecting sections is placed in a metal mold having a predetermined configuration and buried and fixed in place in synthetic resin.

3 Claims, 9 Drawing Figures

METHOD OF MANUFACTURING A MAGNETIC HEAD WITH AN MR ELEMENT

BACKGROUND OF THE INVENTION

The present invention relates to a magnetic head of the type using a magnetoresistive (MR) element.

An MR element is well known in the art as an element whose electric resistance varies in response to a magnetic flux. Typically, a magnetic head using such an element is used in the magnetic recording and playback art for the purpose of reproducing a signal which is stored over the full width of a magnetic tape for the quick review of information signals which are also stored in the tape, as disclosed in Japanese Unexamined Patent Publication (Kokai) No. 55-8638 and Japanese Patent Publication No. 58-33610 by way of example. This kind of magnetic head includes a metal member for supporting an MR element, a permanent magnetic for developing a bias magnetic field which is to be applied to the MR element, and metal lead members electrically interconnected to the MR element. All these members are received and fixed in place in a casing made of synthetic resin while being held in a predetermined positional relationship.

Such a prior art magnetic head is produced by placing the metal member and metal lead members in predetermined positions inside a metal mold, then pouring synthetic resin into the metal mold to embed them in the resultant casing while, in the event of molding, rigidly mounting the MR element and permanent magnet in a cavity defined in a part of the casing in predetermined positional relationship, and then electrically connecting the metal lead members to the MR element. In this manner, the various members have to be installed and fixed in place accurately in a predetermined positional relationship, increasing the number of production steps required and hampering automatic production of magnetic heads.

SUMMARY OF THE INVENTION

It is therefore an object of the present invention to provide a magnetic head with an MR element which allows a minimum of scattering to occur and has high accuracy despite a small number of production steps.

It is another object of the present invention to provide a generally improved magnetic head with an MR element.

In accordance with the present invention, there is provided a magnetic head for recording and reproducing information out of a magnetic tape, comprising an MR element consisting of a first base plate having a surface which forms a part of a tape-contact surface with which the magnetic tape is to make contact, and a second base plate bonded to the first base plate and having a surface which constitutes another tape-contact surface and a surface on which a ferromagnetic thin film having a predetermined pattern is provided, a permanent magnet for developing a bias magnetic field which is to be applied to the MR element, a lead frame consisting of an MR element mount section supporting the MR element such that the tape-contact surfaces of the first and second base plates are flush with each other, a magnet mount section supporting the permanent magnet in such a position as to apply the bias magnetic field to the MR element, lead connecting sections electrically interconnected to the pattern on the second base plate for constituting leads of the magnetic head, and tape-contact sections so shaped as to be flush with the tape-contact surfaces of the MR element, the respective sections of the lead frame being constructed integrally with each other, and a casing embedding and fixing in place therein the lead frame in which the MR element and permanent magnet are mounted in individual mount sections and the pattern on the MR element and the lead connecting sections of the lead frame are electrically interconnected, the casing being provided with a predetermined contour which is a contour of the magnetic head.

In accordance with the present invention, there is also provided a method of producing a magnetic head which includes an MR element and a permanent magnet for applying a bias magnetic field to the MR element, comprising the steps of providing a thin sheet of metal, shaping the sheet in a predetermind pattern to produce a lead frame having an MR element mount section for mounting the MR element, a magnet mount section for mounting the permanent magnet, lead connecting sections to be electrically connected to the MR element, and tape-contact sections with which a magnetic tape is to make contact, bending the tape-contact sections perpendicularly to a general plane of the lead frame, placing the MR element in the MR element mount section such that a tape-contact surface of the MR element is flush with the tape-contact sections of the lead frame, placing the permanent magnet in the magnet mount section, electrically connecting the lead connecting sections of the lead frame to connecting sections of the MR element, placing the frame in an assembled condition in a metal mold and pouring synthetic resin into the metal mold such that the tape-contact surface of the MR element and the tape-contact surfaces of the lead frame are exposed to the outside and end portions of the lead connecting sections of the lead frame extend to the outside, thereby embedding the lead frame in the synthetic resin, and finishing a molding of the synthetic resin to a predetermined contour of the magnetic lead.

In accordance with the present invention, there is further provided, in a magnetic head having an MR element which includes a tape contact surface to make contact with a magnetic tape and lead terminal connecting sections, and a permanent magnet for applying a bias magnetic field to the MR element, a lead frame formed by shaping a sheet of metal in a predetermined pattern and folding the shaped sheet, comprising an MR element mount section for mounting the MR element, a magnet mount section for mounting the permanent magnet, lead connecting sections for constituting lead terminals of the magnetic head when the lead terminal connecting sections of the MR element are connected to the lead connecting sections, and tape-contact sections so formed as to become flush with the tape-contact surface of the MR element.

The above and other objects, features and advantages of the present invention will become more apparent from the following detailed description taken with the accompanying drawings.

DESCRIPTION OF THE PREFERRED EMBODIMENT

Figure 1:
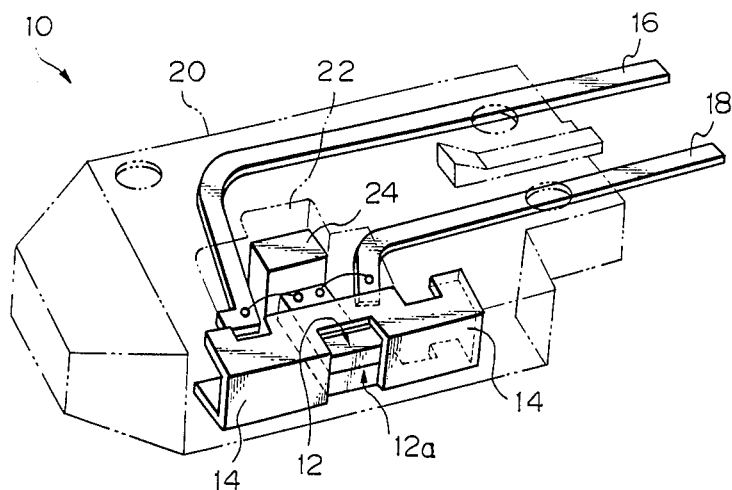
FIG. 1 is perspective view of a prior art magnetic head with an MR head.

To facilitate an understanding of the present invention, a brief reference will be made to a prior art magnetic head of the type using an MR element, shown in FIG. 1. The prior art magnetic head, generally 10, includes an MR element 12 which is held by a support member 14 such that a surface thereof which is to make sliding contact with a magnetic tape is exposed to the outside. The support member 14 is implemented with a shaped sheet of metal. Lead members 16 and 18 which are also implemented with metal are electrically interconnected to the MR element 12. Specifically, the lead members 16 and 18 are electrically interconnected to terminal portions of a predetermined pattern of ferromagnetic material which is provided on a wear-resistive base plate, which constitutes a part of the MR element 12. The support member 14 and lead members 16 and 18 are disposed in a casing 20 which may be made of phenol resin by way of example. The casing 20 is notched to have a cavity 22 in which the MR element 12 and a permanent magnet 24 are received.

A procedure for producing the magnetic head 10 having the above construction will be described. The procedure begins with locating the support member 14 and lead members 16 and 18 accurately in predetermined positions inside a metal mold which is used to mold the casing 20 of the head 10 with synthetic resin. Then, synthetic resin is poured into the metal mold to mold the casing 20 which has the support member 14 and lead members 16 and 18 embedded therein. The MR element 12 and permanent magnet 24 are mounted in the cavity 22 of the resultant molding, or casing, 20 in a predetermined positional relationship as shown in FIG. 1. Specifically, the MR element 12 is installed and fixed in place in the cavity 22 of the casing 20 such that a particular surface thereof which is to make contact with a magnetic tape is flush with that surface of the support member 14 which is to make contact with the tape. The permanent magnet 24, on the other hand, is located and fixed in place at the rear of the MR element 12. The magnet 22 is adapted to develop a bias magnetic field which is to be applied to the MR element 12. Thereafter, the lead members 16 and 18 are soldered, wire-bonded or otherwise connected electrically to terminal portions of the pattern which is provided on the base plate of the MR element 12. Finally, the cavity 22 of the casing 20 is filled with synthetic resin.

A prerequisite with the prior art head 10 having the MR element 12 is that in the event of embedding the support member 12 and lead members 16 and 18 in the casing 20 by injection molding or like technology, the respective members be accurately located in their predetermined positions inside a metal mold. Further, when the MR element 12 is to be mounted on and fixed to the support member 14 such that the tap-contact surface thereof becomes flush with that of the support member 14, the MR element 12 has to be located with extreme accuracy. These add to the number of production steps required and, furthermore, obstructs automatic production of such magnetic heads.

Hereinafter will be described a magnetic head with an MR element in accordance with the present invention and a method of producing it.

Figure 2:
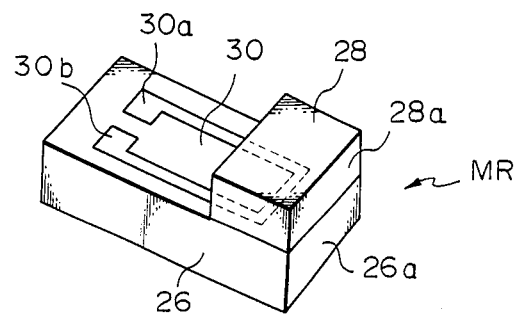
FIG. 2 is a perspective view of an MR element which is applicable to the present invention.
Figure 3:
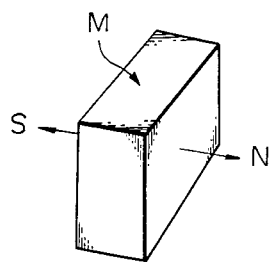
FIG. 3 is a perspective view of a permanent magnet also applicable to the present invention.

Referring to FIG. 2, a specific structure of an MR element which is applicable to the present invention is shown. The MR element, generally MR, comprises base plates 26 and 28 each being made of an insulating material which is resistive to wear, e.g. glass. The base plates 26 and 28 are bonded to each other by an adhsive. Provided on the top of the base plate 26 is a thin film 30 which is made of a ferromagnetic material and configured in a predetermined pattern. The thin film 30 includes terminals 30a and 30b for electrical connection. The base plates 26 and 28 respectively have surfaces 26a and 28a with which a magnetic tape makes contact during magnetic recording and playback. FIG. 3 shows a permanent magnet M having a north pole N and a south pole S for developing a bias magnetic field which is to be applied to the MR element MR of FIG. 2.

Figure 4:
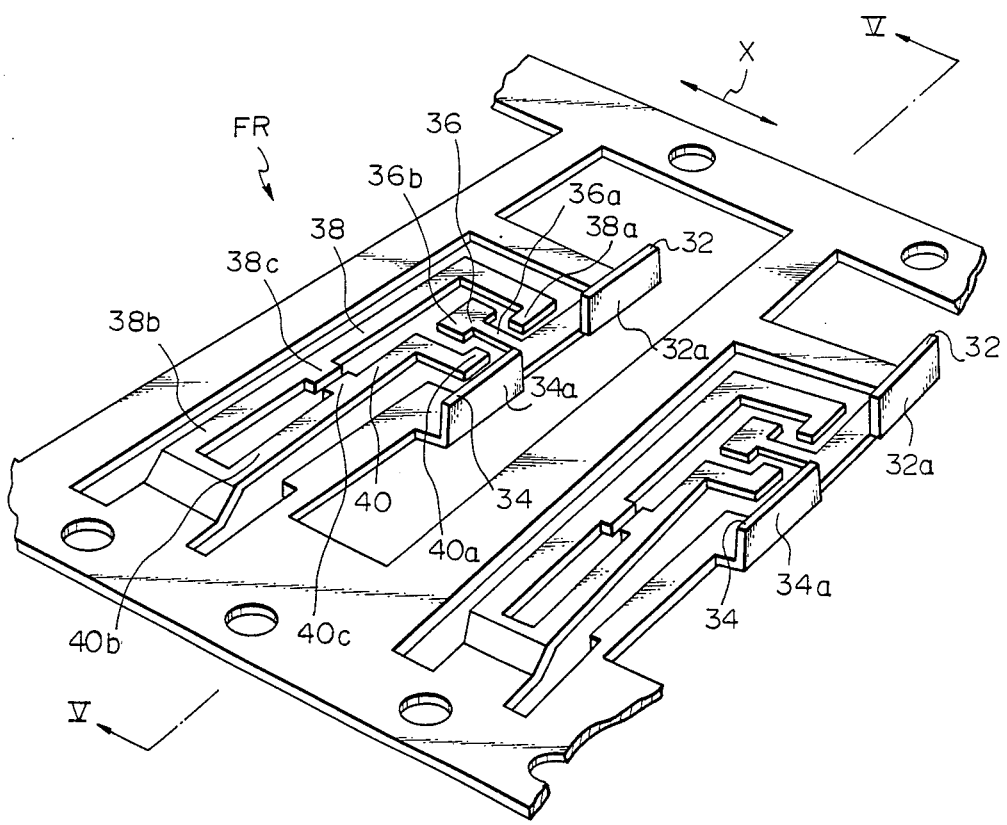
FIG. 4 is a perspective view of a lead frame which constitutes a part of a magnetic head with an MR element embodying the present invention.

Referring to FIG. 4, there is shown a lead frame FR adapted to support the MR element MR of FIG. 2 and the permanent magnet M of FIG. 3. The lead frame FR comprises a sheet of suitable metal such as nickel-silver alloy, phosphor bronze, stainless steel or brass and is produced by pressing, etching or otherwise shaping the sheet in a predetermined pattern and, then, folding predetermined portions thereof. Specifically, the lead frame FR includes tape-contact portions 32 and 34 which are bent perpendicularly to the general plane of the frame FR. The tape contact portions 32 and 34 respectively have surfaces 32a and 34a with which a magnetic tape may make contact. A mount portion 36 is contiguous with the upright tape-contact portions 32 and 34 and adapted to support the element MR and permanent magnet M. As shown, the mount portion 36 consists of an MR element mount section 36a for fixing the MR element MR in place such that the tap-contact surfaces 26a and 28a of the base plates 26 and 28 as shown in FIG. 2 are substantially flush with the those 32a and 34a of the tape-contact portions 32 and 34, and a magnet mount section 36b for fixing in place the permanent magnet M as shown in FIG. 3.

The lead frame FR further includes lead portions 38 and 40 which are provided with connecting sections 38a and 40a, respectively. The connecting sections 38a and 40a are respectively adapted for electrical connection with the terminals 30a and 30b of the thin film 30 which is provided on the base plate 26 of the MR element MR. The lead portion 38 is also provided with a terminal section 38b and a lug 38c, and the lead portion 40 with a terminal section 40b and a lug 40c. The terminal sections 38b and 40b serve as connecting terminals of a magnetic head when the latter is completed. The lugs 38c and 40c, on the other hand, cooperate to prevent the lead portions 38 and 40 from getting out of synthetic resin when the terminal sections 38b and 40b are heated due to soldering which may be effected for connection with an external circuit.

The lead frame FR configured as described above constitutes a unit, and a desired number of such units are produced in an array which extends in a direction as indicated by an arrow X in FIG. 4. A specific procedure for producing the magnetic head in accordance with the present invention will be described.

Figure 5:
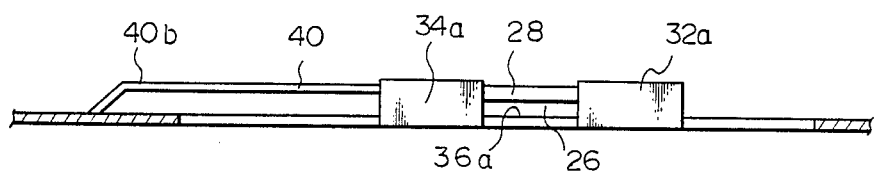
FIG. 5 is a side elevation as viewed along a line V—V of FIG. 4, showing the lead frame of FIG. 4 and an MR element rigidly mounted on the lead frame.
Figure 6:
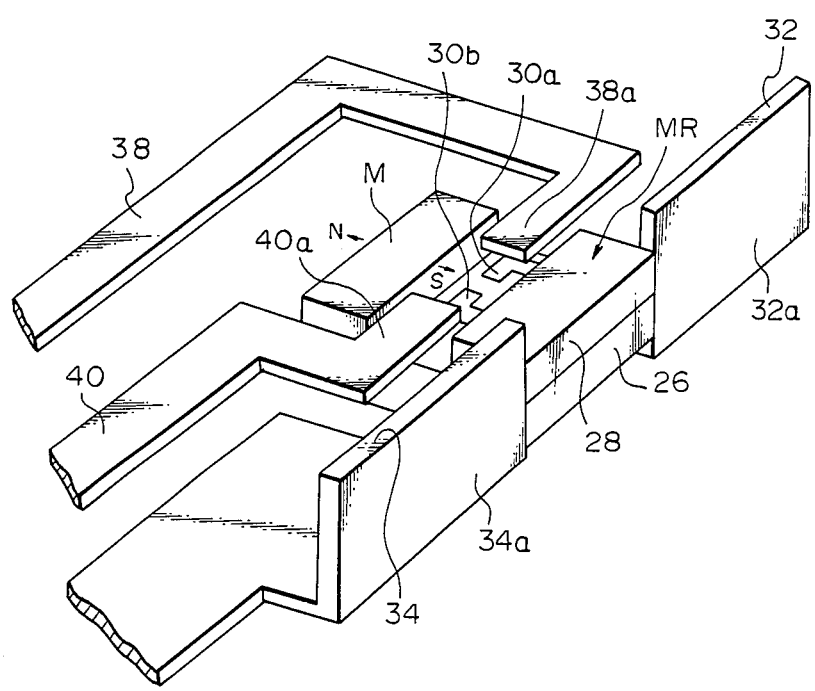
FIG. 6 is a perspective view of the lead frame and MR element as shown in FIG. 5.

The base plate 26 of the MR element MR is laid face up on the MR element mount section 36a of the mount portion 36. Specifically, the element MR is placed on the MR element mount section 36a such that the tape-contact surfaces 26a and 28a of the element MR are flush with those 32a and 34a of the tape-contact portions and 34 and, then, the back of the base plate 26 is rigidly connected to the MR element mount section 36a by adhesive. Likewise, the permanent magnet M is placed on the magnet mount section 36b of the mount portion 36 such that the N and S poles of the magnet M are parallel to the surface of the thin film 30 and perpendicular to the tape-contact surfaces 26a and 28a of the element MR, and bonded thereto by adhesive. A configuration at this stage of assembly is shown in FIGS. 5 and 6. It is to be noted that FIG. 5 is a section along line V—V of FIG. 4 which shows the base plate 26 of the element MR mounted face up on the MR element mount section 36a of the mount portion 36.

The above step is followed by connecting the terminal 30a of the thin film 30 provided on the base plate 26 and the connecting section 38a of the lead portion 38 electrically to each other by soldering or wire bonding which may be implemented with a wire of gold or aluminum. Likewise, the other terminal 30b of the thin film 30 and the connecting section 40a of the lead portion 40 are electrically connected by soldering or wire bonding which may also be implemented with a wire of gold or aluminum.

Figure 7:
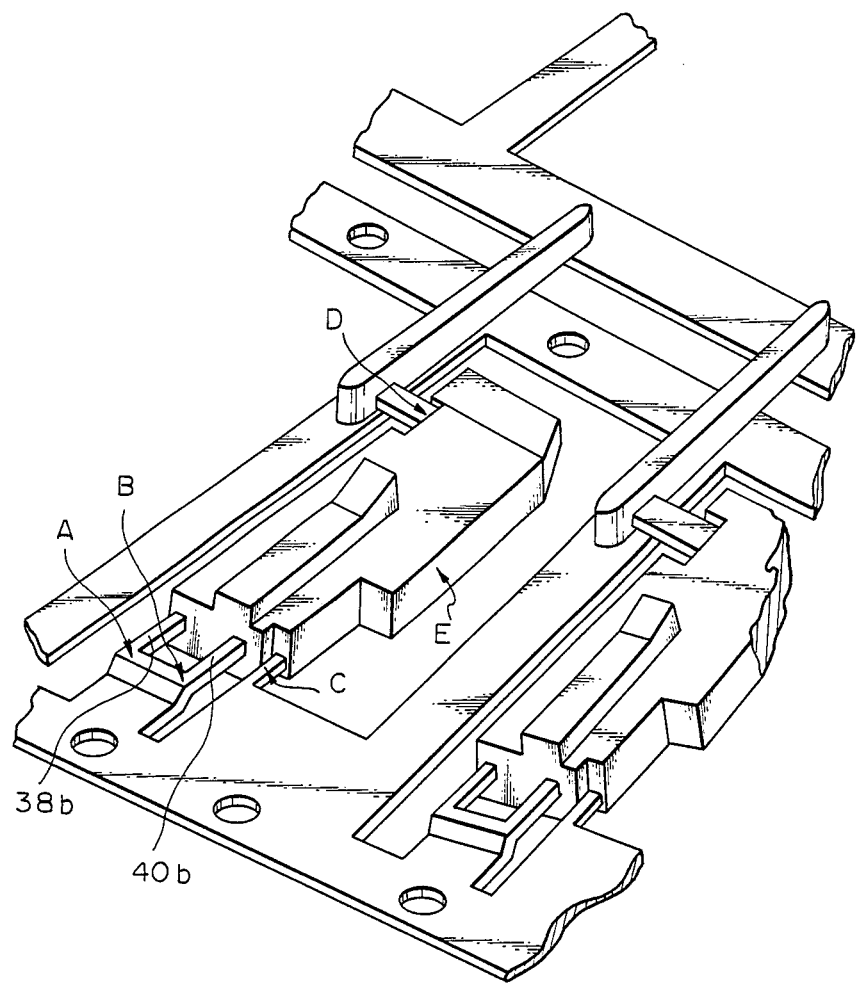
FIG. 7 is a perspective view of a magnetic head which is removed from a metal mold.

The assembly on the lead frame FR as described above is placed in a metal mold for injection molding or transfer molding integrally with the lead frame FR. Subsequently, suitable synthetic resin such as unsaturated polyester resin, phenol resin or epoxy resin is poured into the metal mold to produce a casing, the previously stated structural elements being embedded in the casing. FIG. 7 shows a magnetic head in an almost completed condition which is removed from a metal mold with the various structural elements buried in synthetic resin. In this condition, webbings as indicated by arrows A, B, C and D in FIG. 7 are cut and, then, the tape-contact side E of the head is ground.

Figure 8:
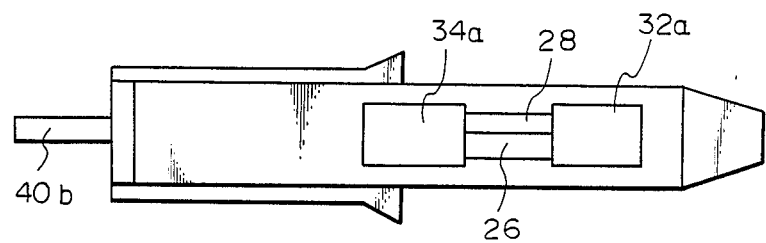
FIG. 8 is a side elevation of a magnetic head completed.
Figure 9:
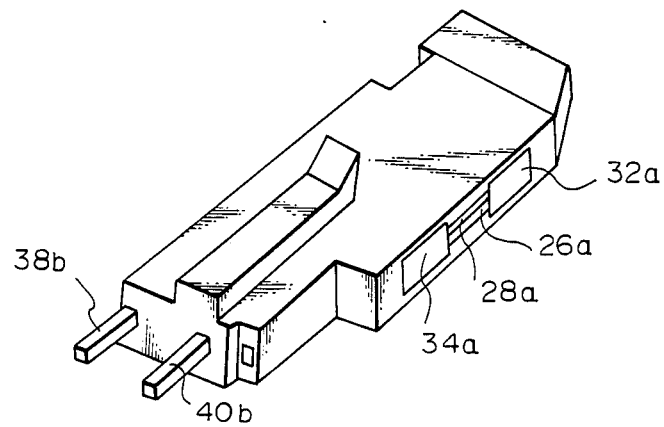
FIG. 9 is a perspective view of the magnetic head as shown in FIG. 8.

By the above procedure, a magnetic head with an MR element in accordance with the present invention is completed as shown in a side elevation in FIG. 8 and in a perspective view in FIG. 9.

In summary, it will be seen that the present invention allows an MR element to be fully positioned by a single manipulation and, yet, allows the manipulation to be easily performed on a lead frame. In addition, the present invention promotes the ease and accuracy of installation of the lead frame in a metal mold in the event of molding. Thus, a magnetic head with an MR element which is inherently low in scattering can be readily produced by a very small number of steps.

Various modifications will become possible for those skilled in the art after receiving the teachings of the present disclosure without departing from the scope thereof.

What is claimed is:

1. A method of producing a magnetic head which includes an MR element and a permanent magnet for applying a bias magnetic field to the MR element, comprising the steps of:
   (a) providing a thin sheet of metal;
   (b) shaping said sheet in a predetermined pattern to produce a lead frame having an MR element mount section for mounting said MR element, a magnet mount section for mounting said permanent magnet, lead connecting sections to be electrically connected to said MR element, and tape-contact sections with which a magnetic tape is to make contact;
   (c) bending said tape-contact sections perpendicularly to a general plane of said lead frame;
   (d) placing said MR element in said MR element mount section such that a tape-contact surface of said MR element is flush with said tape-contact sections of said lead frame;
   (e) placing said permanent magnet in said magnet mount section;
   (f) electrically connecting said lead connecting sections of said lead frame to connecting sections of said MR element;
   (g) placing said frame in an assembled condition in a metal mold and pouring synthetic resin into said metal mold such that said tape-contact surface of said MR element and said tape-contact surfaces of said lead frame are exposed to the outside and end portions of said lead connecting sections of said lead frame extend to the outside, thereby embedding said lead frame in the synthetic resin; and
   (h) finishing a molding of the synthetic resin to a predetermined contour of said magnetic head.

2. A method as claimed in claim 1, further comprising the step of (i) cutting needless portions of said lead frame.

3. A method as claimed in claim 2, further comprising the step of (j) grinding each of said contact surfaces.

* * * * *